(12) United States Patent
Ho et al.

(10) Patent No.: US 8,927,106 B2
(45) Date of Patent: *Jan. 6, 2015

(54) MULTILAYER POLYURETHANE PROTECTIVE FILMS

(71) Applicant: 3M Innovative Properties Company, St. Paul, MN (US)

(72) Inventors: Charlie C. Ho, Woodbury, MN (US); Kenneth J. Halford, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/243,335

(22) Filed: Apr. 2, 2014

(65) Prior Publication Data

US 2014/0212674 A1  Jul. 31, 2014

Related U.S. Application Data (62) Division of application No. 11/912,905, filed as application No. PCT/US2006/015699 on Apr. 26, 2006.

(60) Provisional application No. 60/676,186, filed on Apr. 29, 2005.

(51) Int. Cl.
| | |
|---|---|
| B32B 7/12 | (2006.01) |
| B32B 27/36 | (2006.01) |
| B32B 27/00 | (2006.01) |
| B32B 15/08 | (2006.01) |
| B32B 27/40 | (2006.01) |
| B32B 37/24 | (2006.01) |

(52) U.S. Cl.
CPC ............. *B32B 27/40* (2013.01); *B32B 37/24* (2013.01)
USPC .......................... 428/423.3; 428/412; 156/60

(58) Field of Classification Search
USPC ......... 428/343, 423.3, 412, 354; 524/589, 590
See application file for complete search history.

(56) References Cited

U.S. PATENT DOCUMENTS

| | | |
|---|---|---|
| 3,509,015 A | 4/1970 | Vernon |
| 3,899,621 A | 8/1975 | Willdorf |
| 4,007,151 A | 2/1977 | Ogawa |

(Continued)

FOREIGN PATENT DOCUMENTS

| | | |
|---|---|---|
| EP | 0251546 | 3/1992 |
| EP | 1144125 | 7/2003 |

(Continued)

OTHER PUBLICATIONS

Habenicht, Gerd, Excerpt from the textbook "Kleben" [Adhering] by, pp. 178-180, Springer 1997.

(Continued)

*Primary Examiner* — Samir Shah (57) ABSTRACT

A multilayer protective film comprising a first layer, a second layer and a PSA layer. The first layer at least comprises a polyester-based polyurethane, a polycarbonate-based polyurethane or a combination or blend of both. The second layer at least comprises a polycaprolactone-based thermoplastic polyurethane. The PSA layer comprises a pressure sensitive adhesive. One major surface of the first layer is bonded to one major surface of the second layer, and the PSA layer is bonded to an opposite major surface of the second layer such that the second layer is sandwiched between the first layer and the PSA layer.

19 Claims, 1 Drawing Sheet

(56) References Cited

U.S. PATENT DOCUMENTS

| | | | |
|---|---|---|---|
| 4,496,628 | A | 1/1985 | Deatcher |
| 4,530,976 | A | 7/1985 | Kordomenos |
| 4,611,043 | A | 9/1986 | Bruson |
| 4,705,721 | A | 11/1987 | Frisch |
| 4,741,961 | A | 5/1988 | Frisch |
| 4,745,152 | A | 5/1988 | Fock |
| 4,748,192 | A | 5/1988 | Smith |
| 4,931,324 | A | 6/1990 | Ellison |
| 5,114,789 | A | 5/1992 | Reafler |
| 5,242,751 | A | 9/1993 | Hartman |
| 5,342,666 | A | 8/1994 | Ellison |
| 5,403,880 | A | 4/1995 | Hegedus |
| 5,405,675 | A | 4/1995 | Sawka |
| 5,468,532 | A | 11/1995 | Ho |
| 5,478,596 | A | 12/1995 | Gurney |
| 5,563,206 | A | 10/1996 | Eicken |
| 5,736,204 | A | 4/1998 | Suskind |
| 5,820,491 | A | 10/1998 | Hatch |
| 5,848,769 | A | 12/1998 | Fronek |
| 5,877,254 | A | 3/1999 | La Casse |
| 5,939,188 | A | 8/1999 | Moncur |
| 5,945,199 | A | 8/1999 | Morin |
| 6,210,295 | B1 | 4/2001 | Yoneyama |
| 6,383,644 | B2 | 5/2002 | Fuchs |
| 6,399,193 | B1 | 6/2002 | Ellison |
| 6,458,880 | B1 | 10/2002 | Onder |
| 6,475,559 | B1 | 11/2002 | Bettinger |
| 6,607,831 | B2 | 8/2003 | Ho |
| 6,770,360 | B2 | 8/2004 | Mientus |
| 6,894,084 | B2 | 5/2005 | Kovar |
| 6,966,962 | B2 | 11/2005 | Spain |
| 2004/0197572 | A1 | 10/2004 | Bell |
| 2006/0127666 | A1 | 6/2006 | Fuchs |

FOREIGN PATENT DOCUMENTS

| | | |
|---|---|---|
| EP | 0808885 | 4/2004 |
| EP | 1481031 | 7/2007 |
| JP | 6143506 A | 5/1994 |
| JP | 07-052176 | 2/1995 |
| JP | 2001-253033 | 9/2001 |
| JP | 2003527258 | 9/2003 |
| JP | 2004-307532 | 11/2004 |
| JP | 2005125506 | 5/2005 |
| WO | WO 93/24551 | 12/1993 |
| WO | WO 94/13465 | 6/1994 |
| WO | 96/10595 | 4/1996 |
| WO | 97/28472 | 8/1997 |
| WO | 98/37115 | 8/1998 |
| WO | 01/29144 | 4/2001 |
| WO | 02/28636 | 4/2002 |
| WO | WO 03/002680 | 1/2003 |
| WO | WO 03/049942 | 6/2003 |
| WO | WO 03/076542 | 9/2003 |

OTHER PUBLICATIONS

Excerpt from the chemical dictionary Römpp Online, Headword: "Haftklebstoffe (pressure sensitive adhesives)" Document Identifier RD-08-00162, http://www.roempp.com/prod/roempp.php, 1 page, Jun. 27, 2012.

Excerpt from the chemical dictionary Römpp Online, Headword: "Polyurethane" Document Identifier RD-16-03629, http://www.roempp.com/prod/roempp.php, 3 pages, Jun. 27, 2012.

Excerpt from the chemical dictionary Römpp Online, Headword: "Poly (-ε-caprolacton)e" Document Identifier RD-16-03123, http://www.roempp.com/prod/roempp.php, 1 page, Jun. 27, 2012.

DSM brochure entitled "Advanced Polymer Technologies for Graphic Arts, Film Coatings and Adhesives Industry" 2008.

Alberdingk 911 technical infosheet from Alberdingk Boley GmbH dated Nov. 16, 2011.

Plastics handbook "Polyurethanes," vol. 7, 3rd edition, p. 460 (edited by Dr. G. Oertel; Carl Hanser publishers, Munich, Vienna, 1993.

Affidavit of Bruce M. Stump on behalf of Kay Automotive Graphics, Aug. 9, 2012.

Urethane Programs Prior to 2005 (Exhibit A of Opponent II in the Opposition to European Patent 1874541).

NTCNA Specification Tender No. NAM-3355, Kay Automotive, 2002 (Exhibit B of Opponent II in the Opposition to European Patent 1874541).

Photograph of a car front (Exhibit C of Opponent II in the Opposition to European Patent 1874541).

Nissan Drawing Name: Guard-Side, Nissan Drawing No. 93892 8Z400-C1, Mar. 1, 2002 (Exhibit D of Opponent II in the Opposition to European Patent 1874541).

Stonebridge report, "STS #612_3A—Analysis of Clearcoated Film," Jul. 30, 2012 (Exhibit E of Opponent II in the Opposition to European Patent 1874541).

Nissan Frontier Anti Chip Job Ticket, Mar. 26, 2002 (Exhibit F of Opponent II in the Opposition to European Patent 1874541).

Clear component A (Exhibit G of Opponent II in the Opposition to European Patent 1874541).

Clear component B (Exhibit H of Opponent II in the Opposition to European Patent 1874541).

MSDS (acrylic polymer) Jul. 15, 2009 (Exhibit I of Opponent II in the Opposition to European Patent 1874541).

MSDS (isocyanate) Jan. 18, 2005 (Exhibit J of Opponent II in the Opposition to European Patent 1874541).

MSDS (polyester polyols) Jan. 18, 2005 (Exhibit K of Opponent II in the Opposition to European Patent 1874541).

MSDS (urethane film) Jun. 29, 1992 (Exhibit L of Opponent II in the Opposition to European Patent 1874541).

Photographs of cars and car parts (Exhibits M, O, and P of Opponent II in the Opposition to European Patent 1874541).

Product information sheet dated Mar. 2006, specifying the nature of the 3M 610 tape (Ref. D40).

NeoRez R-985 product description (Mar. 2010).

E-mail string between Iris Fuchs, 3M Deutschland GmbH, and Christian Niescher, Lubrizol, dated Jul. 7, 2014 (Exhibit D47 to be filed by Patentee in the Opposition to European Patent 1874541).

Affidavit of Kevin Veenstra, Aug. 5, 2014 (Exhibit D45 to be filed by Patentee in the Opposition to European Patent 1874541).

Affidavit of Charlie C. Ho, Aug. 5, 2014 (Exhibit D46 to be filed by Patentee in the Opposition to European Patent 1874541).

Bonk, H.W. et al., "Pellethane®: A New Generation of Polyurethane Thermoplastic Elastomers," Journal of Elastomers and Plastics, vol. 3, pp. 157-186, Jul. 1971.

Carswell, R. et al., "Polyurethane RIM Modular Windows—A Synergistic Combination of Polymer, Process, and Application," Journal of Elastomers and Plastics, vol. 18, pp. 96-109, Apr. 1986.

Coogan, Richard G., "Post-crosslinking of water-borne urethanes," Progress in Organic Coatings 32, pp. 51-63 (1997).

Dearth, R.S. et al., "An overview of the structure/property relationship of coatings based on 4,4'-dicyclohexylmethane diisocyanate ($H_{12}$MDI)," Progress in Organic Coatings 29, pp. 73-79 (1996).

Dvorchak, Michael J., "Using "High Performance Two-Component Waterborne Polyurethane" Wood Coatings," Journal of Coatings Technology, vol. 69, No. 866, pp. 47-52, Mar. 1997.

Feldman, D., "Polyurethane-Based Sealants Modified by Blending with Kraft Lignin," Journal of Applied Polymer Science, vol. 35, pp. 247-257 (1988).

Guan, S., "High-Solids and 100 Percent Solids Aliphatic Polyurethanes for Exterior Applications: A Survey of Approaches," Journal of Protective Coatings & Linings, pp. 44-52, Jul. 1997.

Hepburn, C., "Trends in Polyurethane Elastomer Technology," Iranian Journal of Polymer Science & Technology, vol. 1, No. 2, pp. 84-110, Aug. 1992.

Noble, K.L., "Waterborne polyurethanes," Progress in Organic Coatings, vol. 32, pp. 131-136, 1997.

Okamoto, Y. et al., "Urethane/acrylic composite polymer emulsions," Progress in Organic Coatings 29, pp. 175-182, 1996.

Rink, H.P. et al., "Water-based coatings for automotive refinishing," Progress in Organic Coatings 34, pp. 175-180, 1998.

(56) References Cited

OTHER PUBLICATIONS

Primeaux II, DJ., "100% Solids Aliphatic Spray Polyurea Elastomer Systems," Journal of Elastomers and Plastics, vol. 24, pp. 323-336, Oct. 1992.

Rausch, K.W. et al., "Structure Property Relationships in Polyurethane Elastomers Prepared by a One-Step Reaction," I&EC Product Research and Development, vol. 4, No. 2, pp. 92-98, Jun. 1965.

Röckrath, U. et al., "Investigation of the crosslinking mechanism of etch-resistant clearcoats," Progress in Organic Coatings 32, pp. 173-182, 1997.

Schmitt, F. et al., "Dimeric isocyanates in polyurethane powder coatings," Progress in Organic Coatings 34, pp. 227-235, 1998.

Schwalm, R. et al., "Tuning the mechanical properties of UV coatings towards hard and flexible systems," Progress in Organic Coatings 32, pp. 191-196, 1997.

Wicks, D.A. et al., "Amine chemistries for isocyanate-based coatings," Progress in Organic Coatings 30, pp. 265-270, 1997.

MULTILAYER POLYURETHANE PROTECTIVE FILMS

CROSS REFERENCE TO RELATED APPLICATIONS

This application is a divisional of U.S. application Ser. No. 11/912,905, filed May 6, 2008, pending, which is a 371 of international application No. PCT/US2006/015699, filed Apr. 26, 2006, which claims the benefit of U.S. Provisional Application No. 60/676,186, filed Apr. 29, 2005, the disclosures of which are incorporated by reference in their entireties herein.

TECHNICAL FIELD

The present invention relates to multilayer films used to protect a surface, in particular, to such films used to protect surfaces (e.g., a painted surface) of a vehicle (e.g., an automobile, aircraft, watercraft, etc.) and, more particularly, to such a multilayer protective film backed by a pressure sensitive adhesive and having a polyurethane layer on top of a thermoplastic polyurethane layer. The present invention also relates to a vehicle, or a body portion thereof, that is protected by the multilayer film as well as a method for making the multilayer protective film.

BACKGROUND ART

Multilayer films that include one or more layers of a polyurethane material are known. Some of these films are disclosed in U.S. Pat. Nos. 6,607,831, 5,405,675, 5,468,532 and 6,383,644 as well as International (PCT) Patent Application No. PCT/EP93/01294 (i.e., Publication No. WO 93/24551). Some of these films have been used in surface protection applications. For example, actual film products that have been used to protect the painted surface of selected automobile body parts include multilayer films manufactured by 3M Company, St. Paul, Minn., under the product designations Scotchcal™ high performance protective film PUL0612, PUL1212 and PUL1212DC. Each of these 3M Company film products includes a thermoplastic polyester polyurethane layer that is backed by a pressure sensitive adhesive (PSA) on one major surface and covered by a water-based polyester polyurethane layer on the opposite major surface.

The present invention is an improvement in such multilayer protective film technology.

SUMMARY DISCLOSURE

In accordance with one aspect of the present invention, a multilayer protective film is provided that comprises a first layer, a second layer and a PSA layer. The first layer consists of, consists primarily of, or at least comprises a solvent-based or water-based polyurethane. The polyurethane is a polyester-based polyurethane, a polycarbonate-based polyurethane or a combination or blend of both. The second layer consists of, consists primarily of, or at least comprises a polycaprolactone-based thermoplastic polyurethane. The PSA layer comprises a pressure sensitive adhesive, and preferably one that is tacky at room temperature. One major surface of the first layer is bonded to one major surface of the second layer, and the PSA layer is bonded to an opposite major surface of the second layer such that the second layer is sandwiched between the first layer and the PSA layer.

It can be desirable for the polyurethane used in the first layer to be at least a slightly crosslinked polyurethane but not a heavily crosslinked or thermoset polyurethane. The polyurethane can be a reaction product of constituents comprising one or more polyols and one or more diisocyanates. Preferably, a mixture of one or more diisocyanates and one or more triisocyanates is used. Improved performance has been obtained by using aliphatic materials in the present multilayer film. For example it can be desirable for the present film to use an aliphatic polyurethane, an aliphatic polycaprolactone-based thermoplastic polyurethane or both. In making the polyurethane, it can also be desirable to use aliphatic components.

A film according to the present invention can be sized and shaped to conform to a surface of a vehicle body part.

In accordance with another aspect of the present invention, a vehicle body part is provided that has a painted surface protected by a multilayer protective film as described herein.

In accordance with an additional aspect of the present invention, a vehicle (e.g., an automobile, aircraft, watercraft, etc.) is provided that includes such a protected body part.

In accordance with a further aspect of the present invention, a method of making a multilayer protective film is provided. The method comprises (a) forming a first layer; (b) forming a second layer; (c) forming a PSA layer comprises a pressure sensitive adhesive; (d) bonding one major surface of the first layer to one major surface of the second layer; and (e) bonding the PSA layer to an opposite major surface of the second layer. The first layer consists of, consists primarily of, or at least comprises a solvent-based or water-based polyurethane. The polyurethane is a polyester-based polyurethane, a polycarbonate-based polyurethane or a combination or blend of both. The second layer consists of, consists primarily of, or at least comprises a polycaprolactone-based thermoplastic polyurethane. The PSA layer comprises a pressure sensitive adhesive, and preferably one that is tacky at room temperature. The layers are bonded together so that the second layer is sandwiched between the first layer and the PSA layer.

The opposite major surface of the second layer can be corona treated beforehand to improve the bond with the PSA layer.

The method step of forming the first layer can further comprise casting or otherwise coating an aqueous-based polyurethane dispersion or a solvent-based polyurethane solution onto a releasable carrier web or liner. The method step of forming the second layer can further comprise extruding the polycaprolactone-based thermoplastic polyurethane at an elevated temperature through a die to form the second layer. The method step of bonding the first layer to the second layer can also further comprise laminating the one major surface of the first layer to the one major surface of the second layer, after the second layer is extruded and while at least the one major surface of the second layer is, or both the second layer and the first layer are, at an elevated temperature that is sufficiently higher than room temperature to facilitate adequate bonding between the first layer and the second layer.

The method step of bonding the first layer to the second layer can alternatively comprise heating at least the one major surface of the second layer, at least the one major surface of the first layer, or the one major surface of both the first layer and the second layer to an elevated temperature and laminating the one major surface of the first layer to the one major surface of the second layer after the second layer is extruded, cast or coated onto a releasable liner, or otherwise formed. The heating can occur before and/or during the laminating. The elevated temperature is sufficiently higher than room temperature to facilitate adequate bonding between the first layer and the second layer during the laminating. This method of bonding can be useful when at least the one major surface of the first layer and the one major surface of the second layer is at about room temperature or at least at a temperature that is too low to facilitate adequate bonding between the first layer and the second layer.

Other features and advantages of the present invention will be apparent from the following description of embodiments thereof, and from the claims.

DETAILED DESCRIPTION OF EXEMPLARY EMBODIMENTS

Although the present invention is herein described in terms of specific embodiments, it will be readily apparent to those skilled in this art that various modifications, re-arrangements, and substitutions can be made without departing from the spirit of the invention.

A multilayer protective film, according to the present invention, comprises a first or PU layer, a second or TPU layer and a PSA layer. The PU layer consists of, consists primarily of, or at least comprises a solvent-based or water-based polyurethane, the polyurethane is a polyester-based polyurethane, a polycarbonate-based polyurethane or a combination or blend of both. The water-based polyurethane can be made from an aqueous-based polyurethane dispersion (i.e., PUD), and the solvent-based polyurethane can be made from a solvent-based polyurethane solution (i.e., PUS). It can be preferable to use PUDs, because of the elimination of the volatile solvents typically associated with using PUSs. The TPU layer consists of, consists primarily of, or at least comprises a polycaprolactone-based TPU (i.e., thermoplastic polyurethane). The PSA layer comprises a pressure sensitive adhesive, and preferably one that is tacky at room temperature. The PU layer is bonded to one major surface of the TPU layer and the PSA layer is bonded to an opposite major surface of the TPU layer such that the TPU layer is sandwiched between the PU layer and the PSA layer.

Superior results have been obtained with a multilayer film, according to the present invention, that includes a PUD layer that uses a polycarbonate-based polyurethane or a polyester-based polyurethane. It is believed that superior results would likewise be obtained with a PUS layer that uses a polycarbonate-based polyurethane or a polyester-based polyurethane. It has also been found that a PUD layer that uses a polycarbonate-based polyurethane exhibits results that are superior to those obtained with a PUD layer that uses a polyester-based polyurethane. It is believed that superior results would likewise be obtained with a PUS layer that uses a polycarbonate-based polyurethane as compared to a PUS layer that uses a polyester-based polyurethane.

The polyurethane can be the reaction product of one or more polyol segments and one or more diisocyanate segments. It is desirable for one or more triisocyanate segments to be used with the diisocyanate. It has been found desirable to use up to about 10%, based on the total weight of the reaction components, of triisocyanate segments with the diisocyanate. The polyol is a polyester polyol, a polycarbonate polyol or a combination of both. Superior results have been obtained using a polycarbonate polyol. It has also been found desirable to use a diisocyanate such as, for example, isophorone diisocyanate, bis(4-isocyanato-cyclohexyl)methane or a combination of both.

Improved performance has been obtained by using aliphatic materials in the present multilayer film such as, for example, an aliphatic water-based polyurethane, an aliphatic polycaprolactone-based thermoplastic polyurethane or both. It is believed that improved performance would likewise be obtained by using aliphatic materials in a solvent-based system such as, for example, an aliphatic solvent-based polyurethane. Thus, in making the polyurethane, it can be desirable to use one or a combination of aliphatic polyols, aliphatic diisocyanates and aliphatic triisocyanates. Superior results have been obtained, for example, using an aliphatic polycarbonate polyol in a PUD layer. It is believed that superior results would also be obtained, for example, using an aliphatic polycarbonate polyol in a PUS layer.

It has been found that it can be desirable for the present multilayer film to use a polyurethane that is at least a slightly crosslinked polyurethane but not a thermoset polyurethane. As used herein, a slightly crosslinked polyurethane is one that can exhibit at least enough melting or at least enough softening, when heated to a sufficiently high temperature, to form a bond that is strong enough to pass the "Tape Snap Adhesion Test" when a layer of the polyurethane is laminated to a layer of the thermoplastic polyurethane. In contrast, as used herein, a thermoset polyurethane is one that is so heavily crosslinked that it does not exhibit a sufficient amount of melting or softening when heated. That is, a thermoset polyurethane will generally burn rather than melt or soften and would not form a bond that is strong enough to pass the "Tape Snap Adhesion Test" when a layer of the thermoset polyurethane is laminated to a layer of the thermoplastic polyurethane, even when the thermoplastic polyurethane is heated before it is laminated.

The present multilayer film can be easier to apply when the PSA layer consists of, consists primarily of or at least comprises a pressure sensitive adhesive that is tacky at room temperature (i.e., around 75° F. (22-24° C.)).

The present inventive multilayer film is typically transparent, and possibly even translucent, for paint protection applications. The present inventive multilayer film may also be transparent, translucent or even opaque for other surface protection or enhancement applications. For some applications, it may be desirable for the present multilayer film to be colored. The present film could be colored such as, for example, by one or more of its layers further comprising a pigment or other coloring agent.

When used, for example, as a paint protection film, it has been desirable for the present multilayer film to be sized and shaped to conform to the surface to be protected, before the film is applied. Pre-sized and shaped pieces of the present multilayer film can be commercially desirable for protecting the painted surface of various body parts of a vehicle such as, for example, an automobile, aircraft, watercraft, etc., especially those portions of the vehicle body (e.g., the leading edge of the front hood and other leading surfaces, rocker panels, etc.) that are exposed to such hazards as flying debris (e.g., sand, rocks, etc.), insects, or the like.

Method of Making

A method of making a multilayer protective film, according to the present invention comprises: (a) forming a first or PU layer; (b) forming a second or TPU layer; (c) forming a PSA layer; (d) bonding one major surface of the PUD layer to one major surface of the TPU layer; and (e) bonding the PSA layer (e.g., by corona treating and thermally laminating, coating or otherwise applying the pressure sensitive adhesive so as to adhere) to an opposite major surface of the TPU layer, with the TPU layer being sandwiched between the PU layer and the PSA layer. The PU layer can consists of, consists primarily of or at least comprises a polyurethane made from an aqueous-based polyurethane dispersion (i.e., PUD) or a polyurethane made from a solvent-based polyurethane solution. The polyurethane can be a polyester-based polyurethane, a polycarbonate-based polyurethane or a combination of both. The TPU layer consists of, consists primarily of or at least comprises a polycaprolactone-based TPU (i.e., thermoplastic polyurethane). The PSA layer comprises a pressure sensitive adhesive, and preferably one that is at least somewhat tacky at room temperature.

In the practice of the method of the present invention, the PU layer may be formed using conventional practices such as, for example, by the aqueous dispersion or solvent solution mixture being cast or otherwise coated onto a releasable carrier web or liner. Those skilled in the art are capable of casting or otherwise coating the aqueous dispersion or solvent solution mixture of the present invention onto a releasable carrier web using known techniques. Suitable carriers may include films such as biaxially oriented polyester and papers that may be coated or printed with a composition that will enable release from the polyurethane compositions. Such coatings include those formed from polyacrylics, silicone, and fluorochemicals. The aqueous dispersion or solvent solution mixture can be coated onto a carrier web using conventional equipment known by those skilled in the art such as knife coater, roll coaters, reverse roll coaters, notched bar coaters, curtain coaters, roto-gravure coaters, rotary printer and the like. The viscosity of the aqueous or solvent mixture can be adjusted to the type of coater used. The water or solvent in the coated mixture is then removed such as, for example, by drying.

The PU layer can be formed, for example, by casting or otherwise coating an aqueous PUD (i.e., polyurethane dispersion) or solvent PUS (i.e., polyurethane solution) onto a readily releasable carrier web or liner (e.g., a polyester carrier web) having a smooth surface. By using such a carrier web or liner having a smooth surface on which to apply the aqueous PUD or solvent PUS, the resulting PU layer can exhibit an exposed major surface with the appearance of having been cast onto a smooth major surface of a releasable carrier web or liner, dried or otherwise cured and the carrier web removed. In contrast, if the PU layer is open air dried or cured such as, for example, by casting or coating the PU layer onto the one major surface of the TPU layer, then the exposed major surface of the PU layer would not exhibit the same smooth appearance.

The TPU layer can be formed by extruding the polycaprolactone-based TPU (i.e., thermoplastic polyurethane) at an elevated temperature through an extrusion die. The TPU layer may also be formed by casting or otherwise molding (e.g., injection molding) the polycaprolactone-based TPU into the shape desired.

The PU and TPU layers can be bonded together, for example by laminating the layers at an elevated temperature and pressure. For example, one major surface of the PU layer can be cold laminated under pressure to one major surface of the extruded TPU layer, while at least the one major surface of the TPU layer is, or both the TPU layer and the PU layer are, at an elevated temperature that is sufficiently high enough to facilitate adequate bonding between the PU layer and the TPU layer. As used herein, cold laminating refers to the layers being laminated together between two nip surfaces in about a room or ambient temperature environment (i.e., the layers are not kept in an intentionally heated environment during the laminating process). The nip surfaces may be two nip rollers, a stationary nip surface (e.g., a low friction surface of a flat or curved plate) and a nip roller, or two stationary nip surfaces. The laminating process may even be performed in a below ambient temperature environment (i.e., the layers are intentionally cooled during the laminating process). For example, one or both of the nip surfaces can be chilled to a temperature below ambient, in order to cool the exposed major surfaces of the polyurethane layers (i.e., the major surfaces the nip surfaces contact). The use of such chilled surfaces can eliminate, or at least help reduce, warping of the layers resulting from the laminating process. At the same time, the major surfaces that make contact at the interface between the polyurethane layers remain at the elevated temperature long enough to be sufficiently bonded together by the laminating pressure exerted by the nip surfaces. Such cold laminating can be accomplished by laminating the newly extruded TPU layer directly onto a preformed PU layer, while the TPU material still retains significant heat from the extrusion process. The PU layer is typically still releasably bonded to the carrier web or liner, to provide additional structural strength.

Alternatively, one major surface of the PU layer can also be bonded to one major surface of the extruded TPU layer by using a hot laminating process. With this process, the initial temperature of both the PU layer and the TPU layer is about room temperature or at least a temperature that is too low to facilitate adequate bonding between the PU layer and the TPU layer. Then, at least the one major surface of the TPU layer, at least the one major surface of the PU layer, or the one major surfaces of both the PU layer and the TPU layer are heated to an elevated temperature that is sufficiently higher than room temperature to facilitate adequate bonding between the PU layer and the TPU layer under the laminating pressure. With the hot laminating process, the layers are heated before or during the application of the laminating pressure. When a hot laminating process is used, a major surface of the TPU layer is typically releasably laminated to a readily releasable carrier web or liner (e.g., a polyester carrier web) directly after the TPU layer is extruded, in order to provide the freshly extruded TPU layer with additional structural support.

Acceptable minimum temperatures and pressures for bonding the layers together, using either the cold or hot laminating process, have included a temperature of at least about 200° F. (93° C.) and a pressure of at least about 15 lb/in$^2$ or psi (10.3 N/cm$^2$).

To facilitate or at least improve bonding between the TPU layer and the PSA layer it can be desirable to corona treat (e.g., air or $N_2$ corona treatment) and thermally laminate the major surface of the extruded TPU layer to be bonded to the PSA layer. To accomplish this, the major surface of the TPU layer, which is not in contact with the PU layer, is exposed and then corona treated. If a hot laminating process is used (i.e., the TPU layer is extruded onto a releasable carrier web or liner), the carrier web or liner must first be stripped off of the TPU layer.

Figure 1:
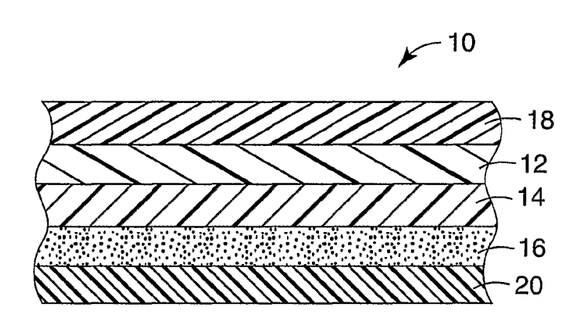
FIG. 1 a cross-sectional view of a multilayer film according to the present invention.

Referring to FIG. 1, an exemplary multilayer film 10, in accordance with the principles of the present invention includes at least a first or PU layer 12, a second or TPU layer 14 and a third or PSA layer 16. An optional releasable carrier web or liner 18 can be releasably bonded so as to protect the surface of the PU layer 12. It is desirable for the film 10 to also include another release liner 20 releasably bonded so as to protect the PSA layer 16.

Tape Snap Adhesion Test

This test provides an indication of how well a film construction remains together after exposure to various conditions. A sample of the pressure-sensitive adhesive coated polyurethane construction is adhered to a painted panel and aged for 24 hours at room temperature. A separate panel is then aged using each one of the conditions listed below.

Water Immersion—panel immersed in 40° C. water bath for 7 days.

Fog chamber—panel aged on a rack at about 30 degree angle and exposed for 7 days at 38° C. in a chamber with 100% condensation Salt spray—panel placed on a rack at about 30 degree angle and exposed for 7 days at 35° C. using a 5% sodium chloride solution in a salt fog chamber After aging, the panel is dried if needed, and then conditioned at room temperature (about 22° C.) for 24 hours. The film is then cross-hatched with a razor blade to form a grid of about 20 squares each measuring about 1 mm by 1 mm. A strip of 610 Tape (available from 3M Company, St. Paul Minn.) is adhered over the cross-hatched area using firm finger pressure, and then the tape is snapped off with a quick pull. The sample is rated as Pass (no delamination of any squares the film or blistering of the film is observed after tape is removed) or Fail (at least one square is removed with the tape or blistering is observed after tape is removed).

Staining and Discoloration Test

This test is an evaluation of the amount of discoloration a film exhibits when exposed to different automotive fluids. The film or the polyurethane construction, is adhered to a test panel. A drop of fluid is placed on the film and aged for 24 hours. The fluid is cleaned with mineral spirits and examined visually for discoloration for each of the fluids. Pass indicates no discoloration was visually observed and fail indicates that discoloration was observed. The panels can also be measured using a colorimeter to determine the discoloration. Test fluids were grease, tar, transmission fluid, motor oil, fuel oil, diesel oil, gear oil, and SUNOCO lub/grease.

Examples 1-3

An aqueous polyurethane coating dispersion was prepared by mixing 83.78 grams of a water-based, polycarbonate-based polyurethane dispersion (ALBERDINGK U933 available from Alberdingk Boley, Inc., Charlotte, N.C.), 0.03 grams of a pH adjuster (aminomethyl propanol available as AMP-95 from Angus Chemical Co., Buffalo Grove, Ill.), 0.19 grams of a sulfosuccinate type anionic surfactant (Triton GR-7M available from Dow Chemical Company, Midland Mich.), 8.47 grams of butyl carbitol (available from Eastman Chemical Co.), 1.08 grams of 2-ethylhexyl α-cyano-α,β'-diphenylacrylate UV light absorber, and 0.45 grams of a light stabilizer (hindred amine light stabilizer based on aminoether functionality available as TINUVIN 123 from Ciba Specialty Chemicals). The dispersion was diluted with de-ionized water to maintain the viscosity between 70 cps and 180 cps. Just prior to coating, 1.30% of a crosslinker (aziridine crosslinker available as NEOCRYL CX-100 from Neoresins, Inc., Waalwijk, Netherlands, a business unit of DSM) were added under agitation. The dispersion was coated to a thickness of about 50 microns onto a polyester carrier web. The coated dispersion was dried and cured sequentially in separate ovens for about 0.5 minutes each. The oven temperatures were set at 121° C., 149° C., and 163° C. for the first, second, and third ovens, respectively. The resulting clear film was about 11-12 microns thick. A thermoplastic polyurethane (caprolactone based polyurethane available as TECOFLEX CLA 93A-V from Noveon) was extruded to a thickness of 150 microns and the extrudate was laminated to the clear film between the nip of a backup roll against the chill roll. After the laminate was cooled, the other side of the thermoplastic polyurethane film was air corona treated at 1 kilowatts and thermally laminated to an acrylic pressure-sensitive adhesive on a paper release liner at 121° C. (250° F.) to form a polyurethane construction.

Examples 2 and 3 were prepared in the same manner except that the thermoplastic polyurethane films were 200 microns and 300 microns thick, respectively.

The polyurethane constructions for each of the examples were tested for adhesion of the clear coat to the extruded thermoplastic polyurethane after aging according to the Tape Snap Adhesion Test described above. All of the samples passed. The polyurethane construction also passed the Staining and Discoloration Test with all of the fluids.

Example 4

A polyurethane construction was prepared according the procedure of Example 1 except the dispersion used for the clear film had 8.28 grams of butyl carbitol, 0.39 grams of TINUVIN-123 light stabilizer, and 0.26 grams of surfactant (silicone based surfactant available as BYK-331 from Byk-Chemie, Wallingford, Conn.). The resulting construction passed the Tape Snap Adhesion Test after all three aging conditions, as well as the Staining and Discoloration Test with all of fluids.

Example 5

A thermoplastic caprolactone-based polyurethane (Tecoflex CLA 93A-V) was extruded to a thickness of about 150 microns onto a polyester carrier web and cooled to room temperature. A clear film, prepared from the water based polyurethane dispersion described in Example 1, was laminated to the thermoplastic polyurethane film using a nip roll set at 121° C. with a nip pressure set at 30 psi. The polyester carrier web on the extruded thermoplastic polyurethane was removed, the surface of thermoplastic polyurethane was air corona treated at 1 kilowatts, and thermally laminated to an acrylic pressure-sensitive adhesive on a paper release liner at 121° C. (250° F.). The resulting construction passed the Tape Snap Adhesion Test after all of the aging conditions, as well as the Staining and Discoloration Test with all of the fluids.

Example 6

A polyurethane construction was prepared according to the procedure of Example 5 except that the extruded polyurethane film was air corona treated and laminated to the acrylic pressure-sensitive adhesive first, and then laminated to the clear film. The resulting construction passed the Tape Snap Snap Adhesion Test after all of the aging conditions as well as the Staining and Discoloration Test with all of the fluids.

Example 7

An aqueous polyurethane coating dispersion was prepared by mixing 89.30 grams of a polycarbonate-based polyurethane dispersion (NEOREZ-986 available from Neoresins, Inc.), 0.35 grams of TINUVIN-123 light stabilizer, 0.20 grams of BYK-025 surfactant, 0.05 grams AMP-95 pH adjuster, 0.20 grams of TRITON GR-7M surfactant, 8.5 grams of butyl carbitol, 1.16 grams of 2-ethylhexyl α-cyano-α,β'-diphenylacrylate, and 0.20 grams of BYK-331 surfactant. The solution mixture was diluted with de-ionized water and to maintain its viscosity between 100 cps and 200 cps. Just prior to coating, 1.78 grams of Neocryl CX-100 were added and the dispersion was coated to a thickness of about 76 micrometers on a thermoplastic polyurethane film. The thermoplastic polyurethane film was a 150 micrometers thick film formed by extruding a polyester-based thermoplastic polyurethane. The clear coat was dried and cured sequentially for about one minute in each of three ovens set at 66° C., 107° C., and 141° C. The resulting polyurethane construction had a clear coat film with a thickness of about 20 micrometers. The construction was left at ambient temperature for 48 hours and tested for adhesion of the clear coat to the thermoplastic polyurethane and staining and discoloration. The construction passed all of the tests.

Example 8

A polyurethane construction was prepared according to the procedure of Example 1 except that the clear film dispersion was made by mixing 89.18 grams of a polyester based polyurethane (NEOREZ 9679 available from Neoresins, Inc.), 0.02 grams AMP-95 pH adjuster, 0.18 grams of Triton GR-7M surfactant, 9.03 grams of butyl carbitol, 1.07 grams of UV light absorber (TINUVIN 1130 available from Ciba Specialty Chemicals) and 0.52 grains of light stabilizer (TINUVIN 292 available from Ciba Specialty Chemicals). The dispersion was coated to a thickness of about 65 micrometers wet on a polyester carrier web. After drying and curing, the clear film had a thickness about 18-20 micrometers. The polyurethane construction was tested for adhesion and passed at all aging conditions.

Examples 9-14

Clear films were prepared according to the procedure of Example 1 except that the polycarbonate-based polyurethane dispersions used and the resulting film thicknesses were as follows:
Example 9—NEOREZ-985 available from Noveon—20 micrometers
Example 10—NEOREZ-9603 available from Noveon—20 micrometers
Example 11—SOLUCOTE-1026 available from Soluol Chemicals—20 micrometers
Example 12—ALBERDINGK U930 available from Alberdingk Boley—20 micrometers
Example 13—ALBERDINGK U933 available from Alberdingk Boley—20 micrometers
Example 14—ALBERDINGK U911 available from Alberdingk Boley—20 micrometers
All of the clear films passed the stain and discoloration test for all of the fluids.

Examples 15-17

Polyurethane constructions were prepared according to the procedure of Example 7 using polyurethane dispersions coated to the thickness shown below.
Example 15—NEOREZ-9603—5.5 micrometers
Example 16—ALBERDINGK U933—11 micrometers
Example 17—ALBERDINGK U911—11 micrometers
All of the constructions of Examples 1 to 17 passed the Tape Snap Adhesion test at all aging conditions as well as the Stain and Discoloration Test for all fluids.
In Examples 4 and 7, it has been found desirable to remove the surfactant Byk-331 from the formulation, because it can cause cloudiness in the layer, after the multilayer film is subjected to the 40° C. water immersion aging during the Tape Snap Adhesion Test. Otherwise, the use of this surfactant does not appear to result in any other negative effect.

Example 18

A solvent-based polyurethane solution was prepared with a Part A and a Part B solution. The Part A solution was prepared by combining 50 grams of the polyester polyol Fomrez-55-225 (from Crompton Corp.), 20 grams of the polyester polyol Fomrez-55-112 (from Crompton Corp.), 5 grams of the polycaprolactone polyol Tone-305 (from Dow Chemicals), 20 grams of the monomer 1,4-butanediol (from BASF), 0.008 grams of the catalyst dibutyltin dilaurate (from Air Products, Inc), 2 grams of the UV light stabilizer Cosorb OSG (from 3M Company), 1 gram of the UV light stabilizer Tinuvin-292 (from Ciba-Geigy Chemicals), 30 grams of the solvent propylene glycol methyl ether acetate, 20 grams of the solvent butyl acetate, and 20 grams of the solvent xylene. The Part B solution was prepared by combining 75 grams of the dicyclohexylmethane diisocyanate Desmodur W (equivalent weight=132) (from Bayer Corp), 10 grams of the aliphatic polyisocyanate, based on hexamethylenediisocyanate, Desmodur N75 (eq wt=255) (from Bayer Corp), and 15 grams of butyl acetate. After Parts A and B are mixed, the resulting solution is coated onto a polyester carrier web and cured according to the following profile: 1 minute at 175° F., 1 minute at 225° F., 1 minute at 265° F., and 1 minute 285° F. The resulting clear film was about 11-12 microns thick. A thermoplastic polyurethane (caprolactone based polyurethane available as TECOFLEX CLA 93A-V from Noveon) is extruded into a film having a thickness of 150 microns. One side of the resulting extruded film is laminated to the clear film between the nip of a backup roll against a chill roll. The other side of the thermoplastic polyurethane film is air corona treated at 4 kilowatts and thermally laminated to a layer of acrylic pressure sensitive adhesive, releasably adhered on a paper release liner, at 190° F. to form the exemplary polyurethane construction.

Example 19

A solvent-based polyurethane solution was prepared with a Part A and a Part B. The Part A solution was prepared by combining 45 grams of the poly(cycloaliphatic carbonate) polyol PC-1667 (from Stahl USA), 20 grams of the polycarbonate polyol PC-1122 (from Stahl USA), 5 grams of the polycaprolactone polyol Tone-305, 20 grams of 1,4-butanediol, 0.008 grams of dibutyltin dilaurate, 2 grams of the UV light stabilizer Cosorb OSG, 1 gram of the UV light stabilizer Tinuvin-292, 30 grams of propylene glycol methyl ether acetate, 20 grams of butyl acetate, and 20 grams of xylene. The Part B was prepared by combining 75 grams of the dicyclohexylmethane diisocyanate Desmodur W (eq wt=132), 10 grams of the aliphatic polyisocyanate, based on hexamethylenediisocyanate, Desmodur N75 (eq wt=255), and 15 grams of butyl acetate. After Parts A and B are mixed, the resulting solution is coated onto a polyester carrier web and cured according to the following profile: 1 minute at 175° F., 1 minute at 225° F., 1 minute at 265° F., and 1 minute 285° F. The resulting clear film was about 11-12 microns thick. A thermoplastic polyurethane (caprolactone based polyurethane available as TECOFLEX CLA 93A-V from Noveon) is extruded into a film having a thickness of 150 microns. One side of the resulting extruded film is laminated to the clear film between the nip of a backup roll against a chill roll. The other side of the thermoplastic polyurethane film is air corona treated at 4 kilowatts and thermally laminated to a layer of acrylic pressure sensitive adhesive, releasably adhered on a paper release liner, at 190° F. to form the exemplary polyurethane construction.

From the above disclosure of the general principles of the present invention and the preceding detailed description, those skilled in this art will readily comprehend the various modifications, re-arrangements and substitutions to which the present invention is susceptible. Therefore, the scope of the invention should be limited only by the following claims and equivalents thereof.

What is claimed is:

1. A vehicle comprising a body part having a painted surface, with said painted surface being protected by a multilayer protective film comprising:
    a first layer comprising a polyurethane, said polyurethane being a polyester-based polyurethane, a polycarbonate-based polyurethane or a combination of both;
    a second layer comprising a polycaprolactone-based thermoplastic polyurethane; and
    a PSA layer comprising a pressure sensitive adhesive,
wherein said first layer is bonded to one major surface of said second layer and said PSA layer is bonded to an opposite major surface of said second layer such that said second layer is sandwiched between said first layer and said PSA layer.

2. The vehicle according to claim 1, wherein said polyurethane is the reaction product of a polyol and a mixture of a diisocyanate and an aliphatic triisocyanate.

3. The vehicle according to claim 2, wherein said diisocyanate is an aliphatic diisocyanate.

4. The vehicle according to claim 1, wherein said polyurethane is said polyester-based polyurethane.

5. The vehicle according claim 1, wherein said polyurethane is an aliphatic polyurethane.

6. The vehicle according to claim 1, wherein said polyurethane is a slightly crosslinked polyurethane.

7. The vehicle according to claim 1, wherein said polyurethane is a water-based polyurethane.

8. The vehicle according to claim 1, wherein said polyurethane is a solvent-based polyurethane.

9. The vehicle according to claim 1, wherein the opposite major surface of said second layer is corona treated.

10. The vehicle according to claim 1, wherein said multilayer protective film is colored.

11. A method of making a multilayer protective film, said method comprising:
    (a) forming a first layer comprising a polyurethane, the polyurethane being a polyester-based polyurethane, a polycarbonate-based polyurethane or a combination of both;
    (b) forming a second layer comprising a polycaprolactone-based thermoplastic polyurethane;
    (c) forming a PSA layer comprising a pressure sensitive adhesive;
    (d) bonding one major surface of the first layer to one major surface of the second layer; and
    (e) bonding the PSA layer to an opposite major surface of the second layer,
wherein the second layer is sandwiched between the first layer and the PSA layer.

12. The method according to claim 11, wherein said forming the first layer further comprises:
    coating an aqueous-based polyurethane dispersion onto a releasable carrier web.

13. The method according to claim 11, wherein said forming the first layer further comprises:
    coating a solvent-based polyurethane solution onto a releasable carrier web.

14. The method according to claim 11, wherein said forming the second layer further comprises:
    extruding the polycaprolactone-based thermoplastic polyurethane at an elevated temperature through a die to form the second layer.

15. The method according to claim 14, wherein said bonding the first layer further comprises:
    laminating the one major surface of the first layer to the one major surface of the second layer, after said extruding and while the one major surface of the second layer is at an elevated temperature that is sufficiently higher than room temperature to facilitate adequate bonding between the first layer and the second layer.

16. The method according to claim 14, wherein said bonding the first layer further comprises:
    laminating one major surface of the first layer to one major surface of the second layer after said extruding and with at least the one major surface of the first layer and the second layer being at a temperature that is too low to facilitate adequate bonding between the first layer and the second layer; and
    heating the one major surface of the second layer to an elevated temperature that is sufficiently higher than room temperature to facilitate adequate bonding between the first layer and the second layer during said laminating,
    wherein said heating occurs before or during said laminating.

17. The method according to claim 16, further comprising:
    releasably laminating an opposite major surface of the second layer to a releasable carrier web after said extruding.

18. The method according to claim 11, further comprising:
    corona treating the opposite major surface of the second layer.

19. The method according to claim 11, wherein the first layer and the second layer are bonded so that the one major surface of the first layer contacts the one major surface of the second layer.

* * * * *

UNITED STATES PATENT AND TRADEMARK OFFICE
CERTIFICATE OF CORRECTION

| | | |
|---|---|---|
| PATENT NO. | : 8,927,106 B2 | Page 1 of 1 |
| APPLICATION NO. | : 14/243335 | |
| DATED | : January 6, 2015 | |
| INVENTOR(S) | : Charlie Ho et al. | |

It is certified that error appears in the above-identified patent and that said Letters Patent is hereby corrected as shown below:

On the title page, item 56

Page 2, Col. 1, line 9, under "OTHER PUBLICATIONS" delete "caprolacton)e"" and insert -- caprolactone)" --.

In the drawings

Sheet 1 of 1, Fig. 1, approx. line 7, below the figure, insert -- Fig. 1 --.

In the specification

Col. 7, line 48, delete "(hindred" and insert -- (hindered --.

Col. 8, line 49, after "Tape" delete "Snap".

Col. 9, line 22, delete "grains" and insert -- grams --.

Col. 10, line 11, delete "Inc)," and insert -- Inc.), --.

In the claims

Col. 11, line 29, in Claim 5, after "according" insert -- to --.

Col. 11, line 31, in Claim 6, after "according" insert -- to --.

Signed and Sealed this
Twenty-third Day of February, 2016

Michelle K. Lee
*Director of the United States Patent and Trademark Office*